United States Patent
Brand

(10) Patent No.: US 6,873,724 B2
(45) Date of Patent: Mar. 29, 2005

(54) RENDERING DEFORMABLE 3D MODELS RECOVERED FROM VIDEOS

(75) Inventor: Matthew Brand, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 657 days.

(21) Appl. No.: 09/925,036

(22) Filed: Aug. 8, 2001

(65) Prior Publication Data

US 2003/0076990 A1 Apr. 24, 2003

(51) Int. Cl.[7] .............................................. G06K 9/00
(52) U.S. Cl. ..................................... 382/154; 345/419
(58) Field of Search .................................. 382/103, 154, 382/203; 348/42, 169; 345/418, 419, 582; 356/12

(56) References Cited

U.S. PATENT DOCUMENTS

| | | | | |
|---|---|---|---|---|
| 6,212,510 B1 | * | 4/2001 | Brand | 706/62 |
| 6,650,335 B2 | * | 11/2003 | Brand | 345/582 |
| 2003/0072482 A1 | * | 4/2003 | Brand | 382/154 |

OTHER PUBLICATIONS

Factorization with uncertainty, by Irani et al., ECCV 2000, p. 539–553.*
Flexible flow for 3D nonrigid tracking and shape recovery, by Brand et al., IEEE 2001, pp. 1–315–1–322.*
Understanding manipulation in video, by Brand, IEEE 1996, pp. 94–99.*
Recovering non rigid 3D shape from image streams, by Bregler et al., IEEE 2000, p. 1–7.*
Digital image processing, by Baxes.*

* cited by examiner

*Primary Examiner*—Vikkram Bali
(74) *Attorney, Agent, or Firm*—Dirk Brinkman; Andrew J. Curtin

(57) ABSTRACT

A method recovers a 3D model of non-rigid 3D shape and motion of an object directly from an input video of the object by first identifying a set of features on the object in a reference image of the input video. Correspondences are then determined between the set of features in the reference image and corresponding features in each other image of the input video, These correspondences are factored by cascaded singular value decompositions into a motion matrix and a shape matrix. The 3D model can then be extracted from the factored motion matrix and shape matrix. The 3D model includes a linear basis for deformable shape of the object in the input video, and for each image a 3D rotations matrix, deformation coefficients, and translation vectors. A novel video can now be generated from the input video by manipulating the 3D model.

20 Claims, 7 Drawing Sheets

RENDERING DEFORMABLE 3D MODELS RECOVERED FROM VIDEOS

FIELD OF THE INVENTION

The present invention relates generally to the field of computer vision, and particularly to recovering 3D models including shape, motion, and deformation of non-rigid objects from videos so that videos can be rendered in a novel manner.

BACKGROUND OF THE INVENTION

The problem of recovering 3D deformable models of non-rigid objects from a video is of intense interest in the field of computer vision. Linear models of variability are particularly desirable. For example, eigenface models have been widely used to model 2D image variability since the 1980's. Eigenface models use a variance-reducing dimensionality-reduction for coding and decoding face images, see U.S. Pat. No. 5,164,992 "Face recognition system" issued to Turk, et al. on Nov. 17, 1992. Eigenface methods describe variation between images but do not shed any light on the 3D structure of scenes and objects from which the images were generated.

A first class of methods addresses special cases of the recovery problem that are well-constrained by additional information. For example, depth estimates are available from multi-camera stereo cameras or laser range-finders; the objects are rigid; object surfaces are specially decorated with textures or markers to make inter-image correspondences obvious; or structured light is used to reveal contours of the object. These constrained methods require various combinations of high-quality, high-resolution videos, calibrated cameras, special lighting, and careful posing.

A second class of methods relaxes image constraints but nevertheless depends on having a pre-computed set of possible models or motion, see Blanz et al., "A morphable model for the synthesis of 3D faces," Proc. SIGGRAPH99, 1999, Bregler et al., "Non-rigid 3D shape from image streams," Proc. CVPR, 2000. However, they do not address the case of both unconstrained motion and no prior understanding of the shape and motion of the object in the video.

Therefore, there is a need to recover 3D models from non-rigid objects in unconstrained videos so that the models can be used to generate an entirely new video where the objects are posed and deformed in novel ways.

SUMMARY OF THE INVENTION

The present invention provides linear methods for recovering of 3D shape, motion, and deformation of non-rigid 3D objects from a video. The video can be low-quality and low-resolution, such as a home-made video, a low-end consumer video, or a video obtained under poor lighting conditions. The output is a 3D deformable model, and 3D motion and deformation parameters. The parameters then can be modified and applied to the model to render the video in a novel manner.

Factoring the 3D deformable model from 2D correspondences in the input video according to the invention is a quartic optimization problem, and is based on cascaded single values matrix decompositions (SVD) that generalize prior art rigid object structure-from-motion factorization.

The invention provides a "parsimony" constraint, and uses the constraint to correct any undesirable properties of the SVDs. In addition, the invention provides improved and generalized methods for factorization of correspondences or intensity variations with respect to uncertainty in the video, and recovers the models directly from image intensities in which inter-image correspondences are found during the factorization.

More particularly, the invention provides a system and method for recovering a non-rigid 3D model of a scene in an input video acquired by a camera. A set of features in the scene are identified in a reference image of the input video. Correspondences between the set of features in the reference image and corresponding features in each other image of the input video are determined. The correspondences are factored into a motion matrix and a shape matrix from which the non-rigid 3D model is extracted. The 3D model includes a linear basis for deformable shape in the scene, and for each image a 3D rotations matrix, deformation coefficients, and translation vectors. The non-rigid 3D model and the input video can now be manipulated to generate a novel video for display from the input video.

DETAILED DESCRIPTION OF THE PREFERRED EMBODIMENT

Method Overview

Figure 1:
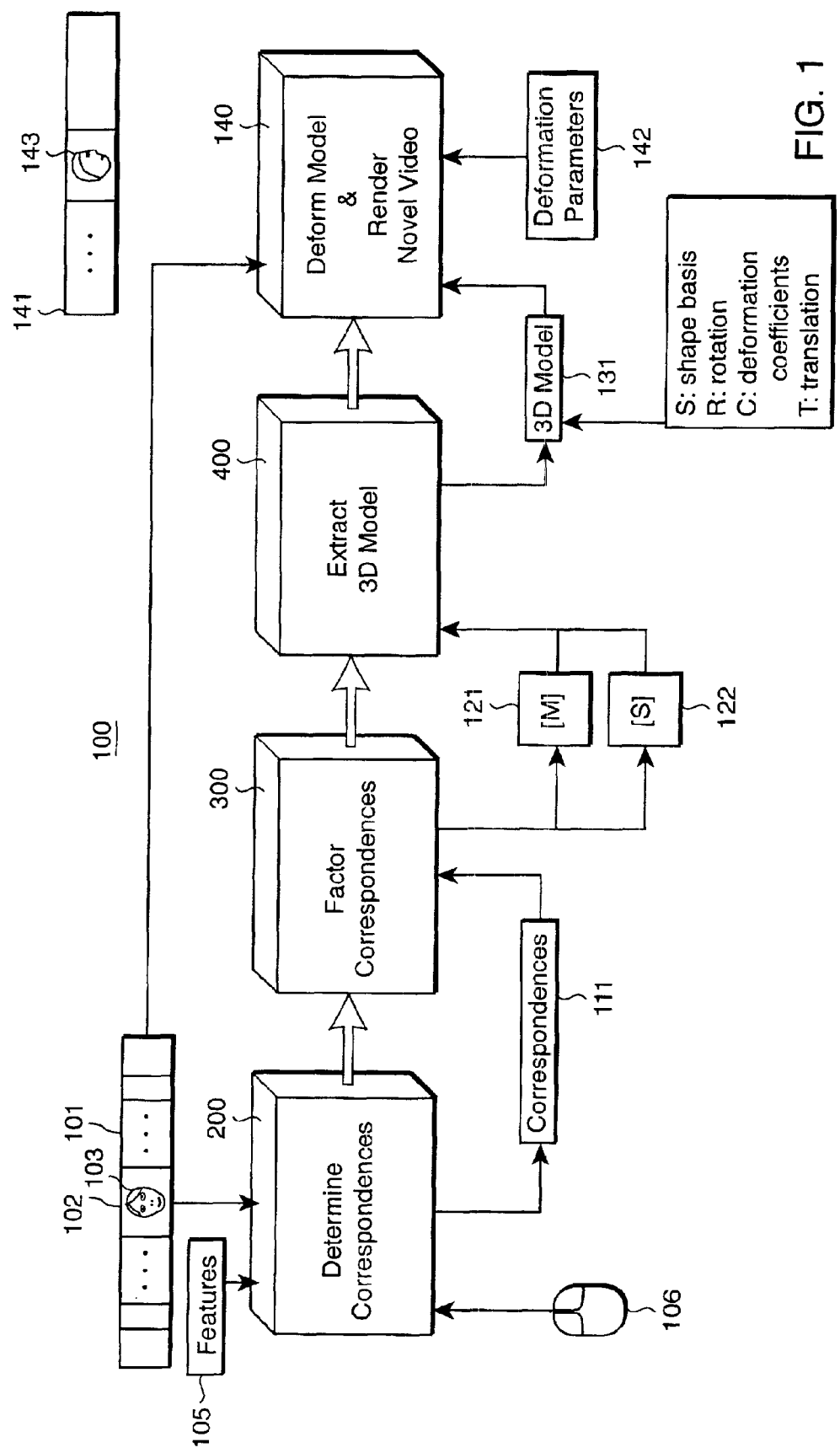
FIG. 1 is a flow diagram of a method for recovering a non-rigid model of an object in a video.

FIG. 1 shows a method 100 according to my invention. The method 100 recovers a non-rigid 3D shape and motion model 131 of an object or a scene directly from an input video 101 obtained by a camera. For example, the video is of a "talking head" 103 seen face on. Techniques and machinery for acquiring images by video or movie cameras are well known.

First, a reference image 102 is selected. The reference image 102 can be any image in the video that is consistent with the general shape and appearance of the object of interest throughout the video, for example, the middle image. Correspondences 111 are then determined 200 for a set of features 105 of the object in each image of the video.

The features 105 can be selected manually or automatically. For example, a pointing device 106 can be used to "click" on a relatively small number of features in the reference image 102. The number of features depends on the desired amount of detail in the final 3D model. For faces, 80–100 features are often sufficient. For best results, the selected features are in regions wherein image intensities vary substantially. This can also be done automatically using known computerized vision systems and procedures that locate regions where the intensity gradient varies in all directions, for example, corners and dots. For example, for a face, the features can be the corners of the mouth, eyes, tip of the nose, etc. The invention can also find correspondences for image regions that have little or no texture. Alternatively, the reference image can be partitioned into equal size patches, and a suitable feature is selected in each patch, or the feature is merely an approximate central point in the patch. This is useful where it is desired to model the entire scene in the video.

The correspondences include at least the 2D (pixel) location (x, y) of each feature. The correspondences can also include information about the image intensities gradients around the features. For tracking purposes, the features can generally be characterized by a small number of pixels, e.g., 5×5, centered at the each feature location. Below, I will describe procedures that recover the 3D model either from estimated feature location (P), or temporal image intensity gradients (Y), which are measurements used to calculate optical flow.

Next, the correspondences 111 are factored 300 using a cascade of singular value matrix decompositions (SVD) and re-orthogonalizations described in greater detail below. The factoring 300 yields a motion matrix (M) 121, and a shape matrix (S) 122. In contrast with the prior art, the shape matrix 122 is deformable, and therefore can represent a non-rigid object or scene. In contrast with the prior art on estimating deformable models, the shape matrix 122 makes minimal use of deformations to account for the image data. This maximizes the probability that the recovered shape and deformations are physically correct. As described in detail below, the factoring can either use the location of the features, or the intensity measurements used to calculate the optical flow at the feature locations.

The 3D model 131 is then extracted 400 from the matrices 121–122 in such a way that the model conforms to the correspondences of the set of features with a minimum residual error and minimal deformations. This is accomplished by a rank reduction in the motion and shape matrices. As described below in greater detail, the 3D model including a linear shape matrix S, and for each frame a 3D rotations matrix R, a deformation coefficients c vector, and a translation vector T.

The 3D model 131 can now be used to generate an entirely novel video 141 according to user supplied deformation parameters 142. For example, the video 101 of the "talking head" 103 seen front-faced is transformed into a video where the talking head is seen in profile 143.

Image Formation Model

I use a simple model of image formation to solve the problem of non-rigid, unconstrained model recovery. An measured pose P of an object (or scene) in an image is a projection of a sum of weighted shape/deformation basis S, rotated R in 3D by R, and translated by T in the image plane, for details, see U.S. patent application Ser. No. 09/791,117 "Modeling shape, motion, and flexion of non-rigid 3D objects in a sequence of images," filed by Brand on Feb. 22, 2001, incorporated herein by reference.

For the input video 101, I can write the projection $P_f$ in image (frame) f as:

$$P_f = (c_f^T \otimes Rf)S + T_f, \quad (1)$$

where $c^T$ represent the transposed vector of deformation coefficients, and $\otimes$ signifies the Kronecker product. For multiple images F, the model for the pose of the object over time can be written as:

$$P = MS + T, \quad (2)$$

where M is a motion matrix defined by vertically stacking $(c_f^T \otimes R_f)$ for all frames.

Of special interest is the structure of the motion matrix M:

$$M = (C^T \otimes 1_{Dx3}) \cdot (1_{Kx1} \otimes R), \quad (3)$$

where C captures the temporal evolution of the deformation, · is the Hadamar product, 1 denotes ones matrices, D the dimensionality of correspondences, and K is the number of modes of deformation, including scale changes.

It is desired to recover the variables C, R, S, and T directly from the inter-image correspondences 111 or intensity variations measured in the video 101.

If all features of the object are measured in all images of the video, the translation T can be estimated as the mean of P, and then removed from P to give a matrix $\underline{P}$ whose rows are zero-mean. A SVD of $\underline{P}$ yields the motion matrix M 121, and the basis S 122. Then, the motion matrix M, in turn, can be decomposed into rotations R and deformation coefficients C. The details of these decompositions follows below.

Like many multi-linear phenomena in images, a key to the successful factorization 300 of the image data, i.e., a factorization that is consistent with the forward model in equation (1), is the application of rank and norm constraints to substructures in these matrices.

Rigid Object Factorization

In the rank K=1 case of rigid object motion, a rank-3 thin SVD $$MS \xleftarrow{SVD} \underline{P}$$

factors motion and shape information from rigid tracking data, see Tomasi et al., "Shape and motion from image streams under orthography: A factorization method," International Journal of Computer Vision, 9(2):137–154, 1992. The pseudo-motion matrix M of left singular vectors associated with the three largest singular values contains the 3D rotation and scale information, while the matching right singular vectors are the pseudo-shape basis S. In a video where a rigid object statistically dominates the images, the remaining vectors contain information about violations of the rigid motion assumption, e.g., non-rigidities and tracking noise.

Affine Correction

The SVD determines both sides up to an invertible 3D affine transformation $G_{3\times 3}$, such that $MS = MG^{-1}GS = \underline{P}$. In order to get proper rotations and shape, one solves for a $G^{-1}$ that restores orthogonal structure to the motion matrix M. The orthogonality of the row vectors m of the x and y components of the rotation matrix R in the matrix $M_f$ in image f give a constraint that is linear in six unknowns of a symmetric matrix $H = G^{-1}G^{-T}$. This can be obtained via standard least-squares methods from a system of linear constraints. Because the matrix H is symmetric, the constraints on the matrix can be expressed very concisely, and an approximate $G^{-1}$ can be determined from a SVD on the matrix H.

Non-Rigid Object Factorization

A proposal to extend the above factorization to non-rigid objects as described by Bregler et al. "Recovering non-rigid 3D shape from image streams," Proc. CVPR, 2000 (BHB factorization). For rank K deformation bases, one performs a SVD of $\underline{P}$ and retains the top ranked three singular vectors. The shape basis S of right singular vectors contains K deformation bases. Each set of D rows in the motion matrix M of left singular vectors is rearranged as if it were an outer product of rotation coefficients and deformation, and factored as such via a second round of rank-1 SVDs. The rotations and shape/deformation matrix are then affine corrected as described below for rigid objects. That method assumes that the first SVD leaves the singular vectors consistently signed and ordered by deformation and dimension, which is generally not the case.

If the data to be factorized are derived from a video of the talking head 103, then the first four channels of greatest variation are head height, width, depth, and vertical jaw motion. Therefore, the shape and perhaps the first deformation will be plausible. However, the subsequent ordering of the channels is unpredictable, leading to mutual contamination of the deformation and rotation estimates. A simple example shows how the BHB factorization is vulnerable to less fortuitous data sets and SVDs.

Imagine two beads riding independently on horizontal rails. The bead system has 3D shape and two independent modes of deformation, requiring a shape/deformation basis having 3D modes. Prior art BHB factorization requires rank-9 data to determine shape and two modes of deformation, but, the system can only produce tracking data that is rank-5. This means that regardless of the amount of input data, BHB factorization can only recover two modes, i.e., shape and a single deformation, that combine the motion of both beads in way that is not necessarily physically valid. The misordered singular vectors also lead to incorrect rotation estimates, which contaminate subsequent deformation bases with torsions. Therefore, improvements in 3D non-rigid model are needed, as described now in detail.

Determining Image Correspondences

Figure 2:
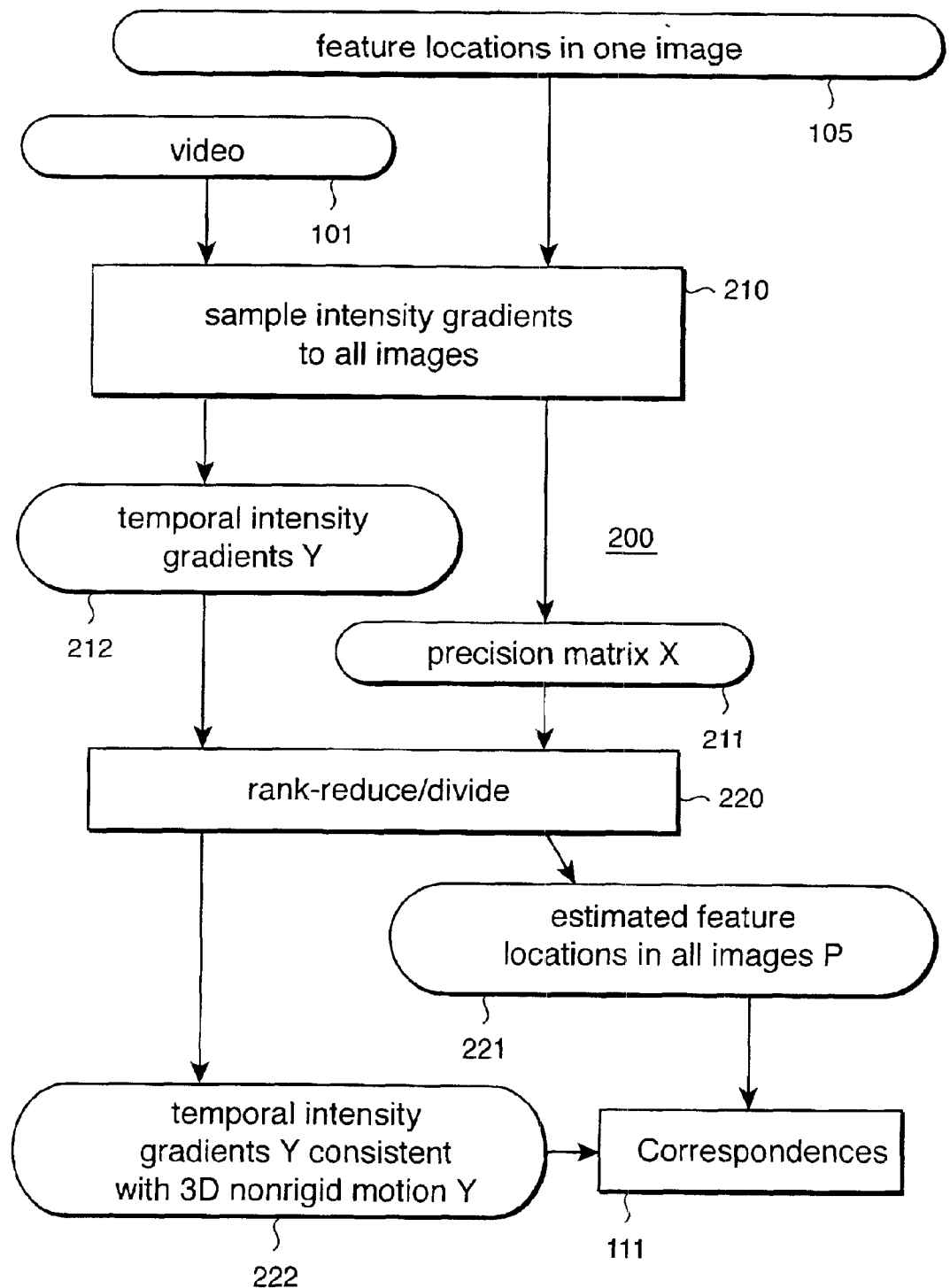
FIG. 2 is a flow diagram of a step of the method of FIG. 1 for determining image features correspondences.

As shown in FIG. 2, step 200 determines the image correspondences 111, i.e., the "evidence" measured in the video. As input, the step takes the video 101 and the locations of the image features 105 identified in the reference image as described above. The image intensity gradients in small regions, e.g., 5×5 pixels centered on the feature locations are sampled 210 spatially and temporally to obtain intensity matrices X 211 and Y 212. These matrices 211–212 can be used to determine an optical flow in the video as described below with reference to FIG. 5.

The intensity variation matrix Y is rank reduced 220 and divided by X to obtain the estimated locations 221 of the features in all images and the temporal intensity gradients 222 thus made consistent with 3D non-rigid object motion in the video 101. The rank reduction, as described in detail below is performed with two successive singular value decompositions (SVDs). The locations and associated intensity gradients form the correspondences 111 used by the factorization step 300.

Factoring Non-Rigid Correspondences

Figure 3:
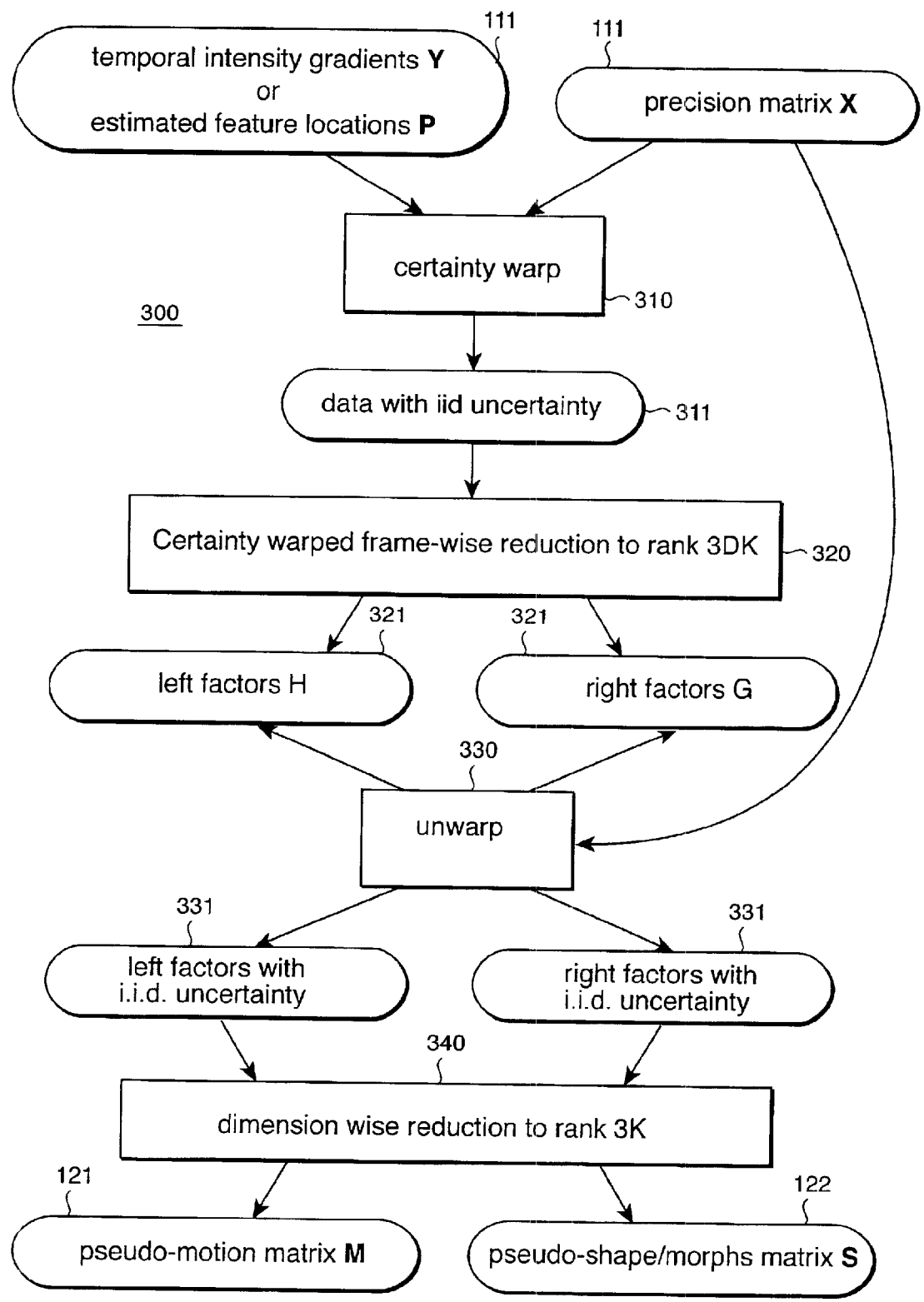
FIG. 3 is a flow diagram of a step of the method of FIG. 1 for factoring the feature correspondences into motion and shape matrices.

The factorization 300 of the correspondences 111 is described with reference to FIG. 3. Factoring uncertain tracking data for rigid object was described by Irani et al. "Factorization with uncertainty," Proc. ECCV, 2000. My factorization corrects some minor errors and then generalizes to non-rigid motion and varied uncertainty structures in the video 101. I use Irani's variable names to facilitate comparison with prior art.

A D-interleave matrix E is defined. Post-multiplication with E rearranges a matrix with columns representing interleaved data, e.g., xyzxyzxyz, to a grouped form, e.g., xxx-yyyzzz; post-multiplication with $E^T$ does the reverse. I use the matrix E to rearrange the block-diagonal inverse covariance spatial matrix X to form a striped matrix $X'=E^T X E$.

I eigen-decompose X' and determine from this a certainty warp Q' 310 such that $Q'Q'^T=X'$ and $Q'^T Q'$=eigenvalues (K)Q' that maps the directionally weighted least-squares problem implied by X' onto an equivalent ordinary least-squares problem where uncertaintainty in the measurements 311 is now identical and independently distributed (i.i.d).

I split the correspondences 111 into new matrices $U_{F\times N}$, $V_{F\times N}$, and, perhaps, an optional $W_{F\times N}$ containing horizontal, vertical, and optional depth ordinates for N features in F frames. I desire a factorization into the shape matrix $S_{3K\times N}$ 122 and motion matrix $M_{DF\times 3K}$ 121 satisfying MS=[U,V,W]$^{(F,N)}$=[$U^T V^T, W^T$]$^T$, with any residual having minimum Mahalanobis (elliptical) error with respect to the metric defined by X. The notation $M^{(a,b)}$ signifies a block-transpose where the matrix M is transposed by treating each block of a×b elements as one element.

I rearrange the correspondences in the new matrices into a horizontally stacked matrix [U,V,W] in which each row describes one image of the video 101. This places all variables whose uncertainty is correlated in the same row so that a certainty warp reduction 320 in rank can be applied. The target factorization can be rewritten as $$[U,V,W]Q' = M(I_D \otimes S)Q'.$$

I perform the 3D rank-K singular value decomposition 320

$$H_1 \Delta_1 G_1 \leftarrow [U,V,W]Q'$$

to suppress noise under a Mahalanobis error norm specified by the matrix X'.

I unwarp 330 the left and right factor of the SVD 320 to remove bias introduced by the certainty warp 310 with Q', using a smaller SVD:

$$H_2 \Delta_2 G_2 \leftarrow \Delta_1 G_1^T / Q'$$

to obtain $H \leftarrow H_1 H_2 \Delta_2^{1/2}$ and $G \leftarrow G_2 \Delta_2^{1/2}$ Now, HG≈[U,V,W] is a minimum squared-error rank-3DK approximation with respect to the error norm of X'.

I make H and G 331 consistent with the target factorization by finding an invertible transform $D_{3DK \times 3DK}$ such that $M^{(F,3K)}=HD^{-1}$, and $DG=(I_D \otimes S)Q'$. Using the above identity, I note that $$[U,V,W]^{(F,3K)}=MS=(HD^{-1})^{(F,3K)}S=(I_D \otimes H)(D^{-1})^{(3Dk,3K)}S,$$

which implies that the desired transform D and shape basis S can be recovered directly via the rank-3K decomposition 340

$$(D^{-1})^{(3Dk,3K)}S \leftarrow (I_D \otimes H)\backslash [U,V,W]^{(F,N)},$$

effectively giving the matrices M and S 121–122.

In contrast to Irani et al., I correctly unwarp the results of the first SVD to yield a fully constrained solution for $D^{-1}$. In the trivial case of isotropic uncertainty, the transform $D^{-1}$ is rank-deficient and contains the best estimate of shape. Depending on the sparsity structure of X', this can be broken into small independent problems, e.g., one per feature.

Factorization from Intensity Gradients

I can also factor 300 directly from intensity variations, which relates to shape and rotation changes through a matrix $Y'^T=X(MS)^{(D)}$. Equivalently, to use the notation of the uncertain factorization method, $Y'E=[U,V,W]X'$. Because the uncertainties in Y'E and [U,V,W] have covariances X' and $X'^{-1}$ respectively, their certainty-warped forms are equivalent and interchangeable. This means that the factoring 300 can be applied directly to Y' by replacing the left hand side of the target factorization with $Y'^T EQ' \Lambda^{-1}$, where $\Lambda$ is the diagonal matrix of eigenvalues of X'.

Central Problem

The crux of the problem is to find an optimal correction matrix $J^{-1}_{3K\times 3K}$ that transforms the result M,S of the above factorization into a properly structured motion matrix M and the shape basis S. Recall from equation 3 that each D×3 block in the matrix M 121 is a scaled rotation whose rows effect the x and y image projection of one deformation basis. These rows have an equal norm and are orthogonal. Moreover, they are orthogonal to the y and x projections taken from any blocks to the left and right, because these blocks are all generated from the same rotation.

For a rigid object, the exact set of necessary and sufficient norm/orthogonality constraints that the motion matrix M must satisfy can be approached by as a squared-error problem via nested least-squares procedures. This is the strategy of the rigid affine correction described above. However, in the non-rigid case, this strategy does not apply because the least-squares procedure first performs a division that discards information about the quadratic terms that will be needed for a second eigen decomposition.

A direct solution is a very difficult problem. Prior art solutions have centered on finding numerically well-behaved heuristics. For example, the BHB factorization sets $J=I_K \otimes G$, a block-diagonal correction that assumes that the SVD correctly arranges all of the information about a deformation basis in the appropriate column-triple in the matrix M.

Experiments with projections of measured 3D image data, whose principal components are known, indicate that the correction matrix J is dense, particularly above the diagonal. This means that the SVD mixes variation due to minor deformations into the shape and principal deformations. Indeed, it is quite difficult to construct a data set for which the correction matrix J has anything vaguely close to a block-diagonal structure, even with vast amounts of noiseless data. Synthetic-data experiments suggest that the scale of the deformations must drop off quadratically in order for the initial SVD to properly group their x, y, and z components. Even then, it is unlikely that the components are consistently ordered within all groups.

Appendix A describes a family of solutions that generalizing the prior art affine correction procedure to non-rigid objects. However, these solutions still suffer from rank-deficiency problems because the number of unknowns grows quadratically while the rank of the constraints grows linearly because the matrix $J^{-1}$ has $9K^2$ unique elements, while there are 4K non-redundant constraints in the motion matrix $M_f$ of each image in the video: one norm and one orthogonality constraint per block, and two orthogonality constraints from the first block to each block to its right. This is a property of the image-formation model of equation 1. Moreover, these constraints tend to be redundant between frames. Therefore, very large amounts of video are needed to correctly estimate J using information in the matrix M only. Consequently any procedure based purely on the expected structure of the motion matrix will fail as the number of deformation modes grows.

Flexible Factorization

My solution constrains the shape/deformation basis S 122 so the deformations are as small as possible relative to the mean shape. Then, the displacement of projected features away from the object's centroid are maximally consistent with the object's shape and only residually accounted for by its deformations. Equivalently, whenever possible, the motions of the feature points should be expressed parsimoniously by rigid transforms, i.e., rotations and scale changes, rather than unparsimoniously by combinations of deformations. Otherwise, all motion could be explained as deformations.

Therefore, I multiply the shape/deformation basis S 122 by the correction matrix J to obtain a corrected shape/deformation matrix, and define a matrix Z as $I_3.\text{diag}[0, 1_{1 \times K-1}]$. Then, I minimize the Frobenius norm of ZS, which is the part of the shape/deformation matrix that contains deformations.

I now have two constraints: the structure of the motion matrix M 121; and the parsimony of the deformations S 122. The problem is that the motion matrix 121 gives constraints on the correction matrix $J^{-1}$ via $M^*=MJ^{-1}$, while the shape/deformation matrix gives constraints on the correction matrix J via $S^*=SJ$.

To work around this inconvenience, I rewrite the motion constraint as MJ=M, where M is an initial estimate of the corrected motion matrix M.

To make the initial estimate M, I can use the non-rigid affine correction described in Appendix A or the BHB factorization, and construct a properly structured motion matrix from the result. Both methods have weaknesses.

Model Extraction

Figure 4:
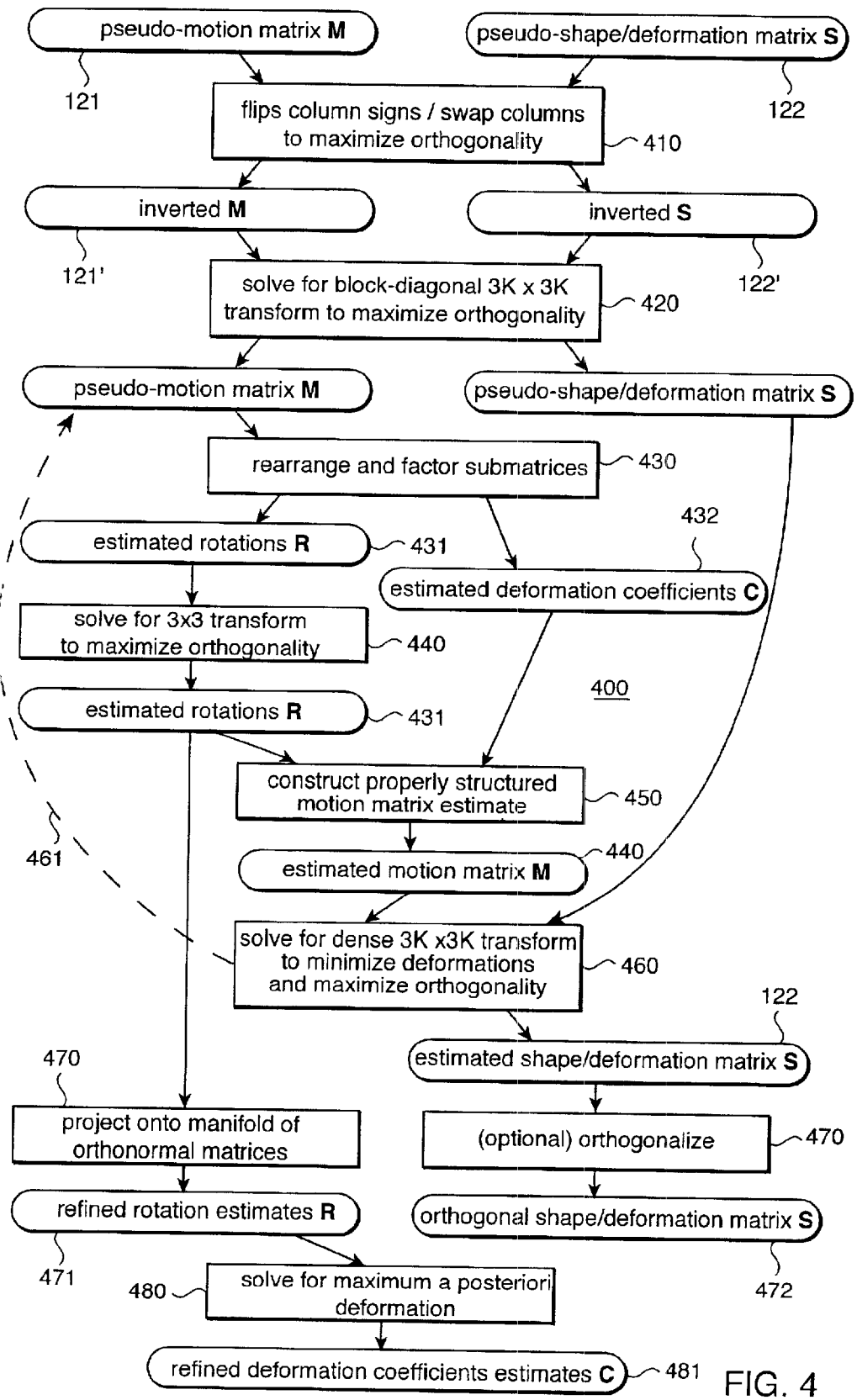
FIG. 4 is a flow diagram of a step of the method of FIG. 1 for extracting a non-rigid 3D from the motion and shape matrices.

Therefore, as shown in FIG. 4 for a more robust procedure 400, I first invert 410 the sign of the left singular vectors in the matrix M 121 as necessary to minimize a residual of the norm/orthogonality constraint, i.e., to maximize orthogonality:

$$\sum_{M_f \in M} \left\| (M_f^T)^T (M_f^T)^T - ((M_f)^T (M_f) \otimes I_D / D \right\|_F^2 \quad (4)$$

where F indicates the Frobenius norm. Maximizing orthogonality leads to better estimates of rotation, and therefore to better estimates of shape. Tests for the desirability of various sign-flips can be done efficiently by caching intermediate results. Short-distance column-swaps can be evaluated in the same manner. The same operation is done for the shape basis S 122 to yield the inverted matrices 121'–122'.

I then affine-correct 420 each column triple of the inverted matrices as described for affine correction, and 3D-rotate each column-triple to a common coordinate frame. I then stack all the column-triples, and determine an affine correction $G^{-1}$ as described above, and apply the affine correction to the stacked column-triples of the matrices.

Here, unlike the BHB procedure, each column-triple has a unique correction. Also, by eliminating the information-lossy factorization into $R_f$ and $c_f$, I obtain estimates of $G^{-1}$ that better reduce the error in the model as set out in equation 1. For each transform to the motion matrix M, a compensatory inverse transform is applied to the shape basis S.

For each image (frame), I then factor 430 each $M_f \in M$ into the rotation matrix $R_f$ 431, and the deformation coefficients $c_f$ 432 using orthonormal decomposition constraints using a procedure 440 based on based on Horn's absolute orientation method, see Horn, "*Closed form solution of absolute orientation using unit quaternions*," J. Opt. Soc.Am.A, Vol. 4, pp. 629–642, 1987. That method directly factors a matrix into a rotation and a vector. I then reconstitute 450 the properly constructed motion matrix M using equation 3. Like the BHB procedure, this assumes a block-diagonal correction. However, my estimate is only an initial estimate of the motion matrix, and the off-diagonal elements of the correction matrix J are recovered as described below. It is also possible to factor each into a rotation and deformation coefficients via rank-1 SVD, then affine-correct the rotations yet again.

Combining the constraints from the motion and shape/deformation matrices, I obtain the objective function $$\min_{J} \text{trace}((MJ-M)^T \cdot (MJ-M)) + tr(S^T J^T ZJS). \quad (5)$$

This objective function seeks the correction operator J that yields the expected structure in the motion matrix M with the smallest possible deformations in the shape/deformation basis S and coefficients matrix C. The error is minimized by a solution to a system of equations MJ=M and ZJS=0. The sought correction matrix J is obtained from a sparse right-handed division $$J \leftarrow \frac{\left( \begin{bmatrix} I_{3K} \otimes M \\ S^T \otimes Z \end{bmatrix} \right)}{\begin{bmatrix} M \\ 0_{3KN \times 1} \end{bmatrix}}. \quad (11)$$

This allows me to determine 460 S←JS, and M←M/J. Because equation 11 uses information on both sides of the SVD, it is well constrained. In practice, I find that the upper triangle and several sub-diagonals of J are usually dense, indicating that information about any particular deformation is indeed spread over several columns of the motion matrix M.

It is also possible to repeatedly 461 apply equation (11) after re-estimating rotations and deformation, but such iterations only yield small improvements in the shape/deformation bases S.

The estimate rotation matrix 431 and shape matrix 122 can be refined by projection onto a manifold of orthogonal matrices. The refined matrices 471–472 are then solved 480 to obtain the deformation coefficients c 481, see U.S. patent application Ser. No. 09/791,117 *"Modeling shape, motion, and flexion of non-rigid 3D objects in a sequence of images,"* particularly equations 6 and 8 for details.

Image Gradients

Figure 5:
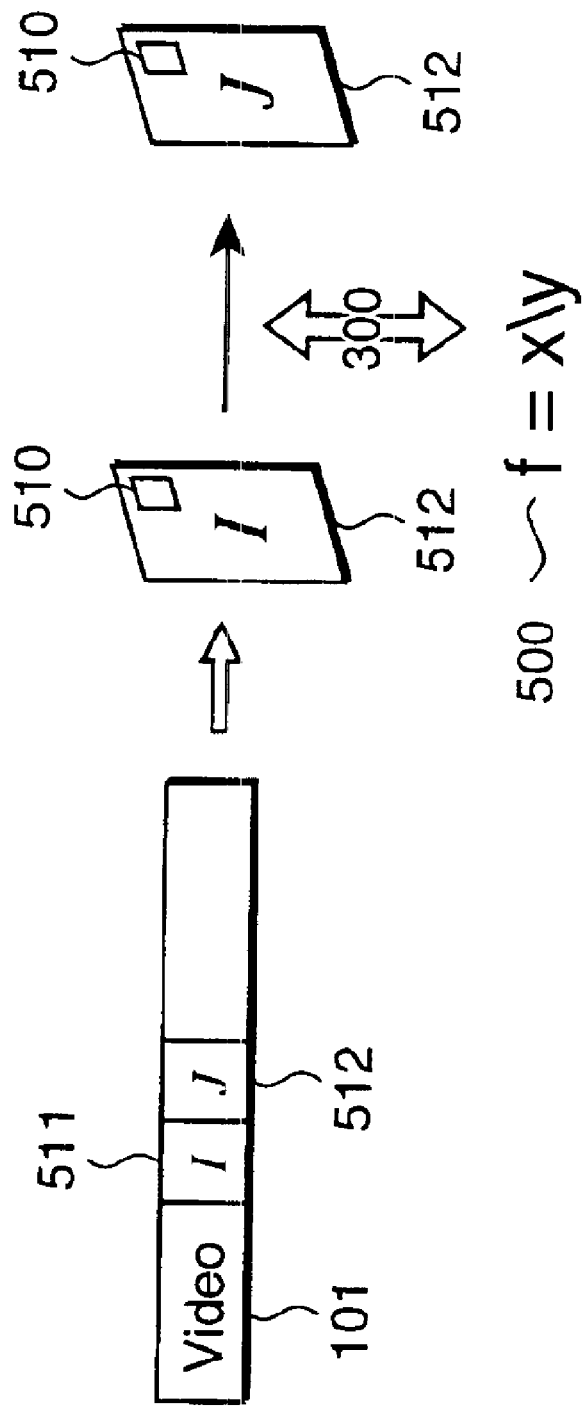
FIG. 5 is a block diagram of optical flow in successive images of a video.

As stated earlier, the method 100 according to the invention can be entirely performed with image intensity gradients when considering the setting as shown in FIG. 5. A small region R 510, e.g., 5×5 pixels, in an image $I_0$ 511 shifts to a new location in a next image $I_1$ 512 Assuming that the images view a constantly illuminated Lambertian (diffuse reflective) surface, the 2D optical flow $f_{2 \times 1}$ 500 can be estimated, to the first-order, from the spatial image gradient $$\nabla_p = dI_0(p)/dp \text{ as } f \leftarrow X \backslash y, \quad (6)$$

where the $X_{2 \times 2} = \int_R \nabla_p \nabla_p^T$ dp is the local R 510 spatial variation of the image intensity within the image $I_0$, and $y_{2 \times 1} = \int_R I_0(p) - I_1(p))$ is the temporal image intensity variation between images $I_0$ and $I_1$. For a given video, good estimates of X are usually possible. However, the temporal variation Y is sensitive to noise in the image intensities. Assuming this noise is Gaussian distributed, the spatial variation X has special significance as the inverse covariance matrix of the flow estimate L The eigen-vectors of f give the directions in which the optical flow is most and least certain.

I represent N local flows for each of the F images simultaneously in matrices $F_{DN \times F}$ $Y_{DN \times F}$, and diagonally stacked $X_{DN \times DN}$. If X describes the spatial intensity variation around the features in the reference image 102, and each column of each matrix $Y_f \in Y$ describes temporal intensity variation between the reference image $I_0$ and a target image $I_f$, then in the absence of additional constraints, Y=XF. The covariance of the uncertainty in F is $\Sigma_F = X^{-1}$, and conversely $\Sigma_Y = X \Sigma_F X^T = X$.

I will now described how all of the operations of the above section can be applied to X and $Y_f$. First, I eigen-decompose $V \Lambda V^T \leftarrow ?_Y$, and use $Q = \Lambda^{1/2} V^T$ for certainty-warped operations on Y. A certainty warp affine-transforms a problem having an elliptical (Mahalanobis) error norm so that minimum Mahalanobis-error solutions are obtained from least-squares procedures such as matrix division and SVD. I use this to estimate pure translations $$T \leftarrow (QX(1_{n \times 1} I_D))^+ (QY). \quad (7)$$

This is a certainty-warped calculation of the mean displacements. The pseudo-inverse denoted by the super-scripted plus sign is determined by using QR-decomposition and inversion of the upper-triangular D×D matrix. I now remove translation and incorporate position into the temporal intensity variations, obtaining $$Y' = Y + X(P_0 - \bar{P}_0 - T), \quad (8)$$

where $\bar{P}_0$ is the centroid. Here, I use the convention that when adding or subtracting two matrices of different size, the smaller matrix is tiled to match the size of the larger matrix. The matrix Y' is now a function of rotations and deformations only, satisfying $$P = (X \backslash Y')^{(D)} = MS \quad (9)$$

How to factor the zero-meaned correspondence estimates P with respect to their uncertainty, i.e., covariance $\Sigma_{x \backslash y} = \Sigma_F = X^{-1}$, into M and S, is described above, and how to do the same factoring directly from intensity variations Y' with respect to their uncertainty $\Sigma_{Y'} = X \Sigma_F X^T = X$. Then, the flexible factorization 300 described above applies directly.

3D Optical Flow

I use the fact that non-rigid motion is a low-rank multi-linear process to concurrently track a 3D non-rigid object and recover its 3D shape and deformation basis simply by manipulating the rank of optical flow computations.

Irani, in *"Multi-frame optical flow estimation using subspace constraints,"* Proc. ICCV, 1999, describes a low-rank multi-linear process that allows one to track a surface of a 3D rigid object. Her process was based on a premise that the optical flow and associated temporal image gradients from a reference image to subsequent images are bilinear products of two matrices whose low rank is deduced from the camera and scene type.

However, until now, no solutions have been available for the more complex problem of concurrently tracking, and acquiring shape and deformation of non-rigid objects. The fact that the present method provides a low-rank multi-linear process for non-rigid objects enables the rendering of deformable 3D models recovered from deformable objects viewed in videos.

The method according to the invention make it possible to concurrently track a 3D non-rigid object and acquire its 3D shape and deformations by manipulating the rank of the optical flow calculations. The present method reduces P to a rank-3K. This force the motion data to be consistent with the subspace of plausible non-rigid 3D models. Moreover, because temporal intensity gradients Y are locally linearly in motion P, i.e., $Y = XF = X(P_0 - \bar{P}_0 - T)$, uncertainty-informed rank-reduction of the temporal intensity variation matrix Y similarly constrain the optical flow to be in the same subspace.

The key to my method is to manipulate Y' in equation 8 so that the rank constraints implied by equation 9 are applicable. This is accomplished by the intensity-based flexible factorization 300 as described above. I also provide a more efficient procedure.

As described above with reference to FIG. 2, I begin by choosing the reference image $I_0$ 102 from approximately the middle of the video 101. Then, I determine the spatial variation X 221 of the optical flow from image regions 501 within $I_O$, and the temporal variation Y' 221 of the optical flow from comparisons of those regions to similarly locate corresponding regions in all other images of the video 101.

Since MS has rank 3K, equation 9 tells me that Y' has rank 3DK. I eigen-decompose $V\Lambda V^T \leftarrow \Sigma_{Y'} = X$, and use $Q = \Lambda^{1/2} V^T$ to certainty-warp the uncertainty-informed thin SVD $U\Gamma W^T \leftarrow \Sigma_{Y'}$. This is the SVD 320 in FIG. 2.

Because $Q^T Q = X^{-1}$, the product $Q^T U\Gamma W^T \approx X^{-1} Y' \approx X \backslash Y$ is an uncertainty-informed rank-3DK approximation of the rotational and deformational component of the inter-image correspondences. This is the division in step 220.

To conform with MS, rearranging the product yields the final rank-reduction to rank 3K, $U'T''W'^T \leftarrow (Q^T U\Gamma W^T)^{(D)}$. Finally, I restore the translations to obtain correspondences $P_{N \times DF} = U'T''W'^T + T + \overline{P}_0$. New temporal image gradients are sampled 210 with respect to these correspondences, and the process repeats until it converges.

Unlike Irani's process, my method handles rank-reduced optical flow for non-rigid scenes and objects, properly certainty-warps the intensity variations with respect to their own uncertainty prior to SVD, and rank constraints that are exact because they are inherited directly from the forward model; and the SVD produces results that are useful beyond rank-reduction as follows.

The SVD yields $M \leftarrow U'\sqrt{\Gamma'}$ and $S \leftarrow \sqrt{\Gamma'} W'$. These results can be used to extend the range of the video frames being tracked by predicting correspondences in newly generated images via linear extrapolation of the rows at the top and bottom of the motion matrix M. The extrapolations can also be used to warp the video to create new frames that continue the observed motion.

The factorization 300 constraints the search for correspondences, and the search provides information for the factorization. As the process analyzes more and more video frames, the space of possible non-rigid 3D models becomes increasingly more robust. When the correspondence process converges, I need only determine the correction matrix J to recover the final shape/deformation basis S 122 and the motion matrix M 121 Various efficiency improvements can be obtained through incremental SVD (so that prior SVD results are re-used), multi-scale search, and using a subset of all images. For very long sequences, one can analyze a subsequence of the video 101 to obtain the shape/deformation matrix S. This matrix can then be used for robust, efficient tracking in the rest of the video.

Figure 6:
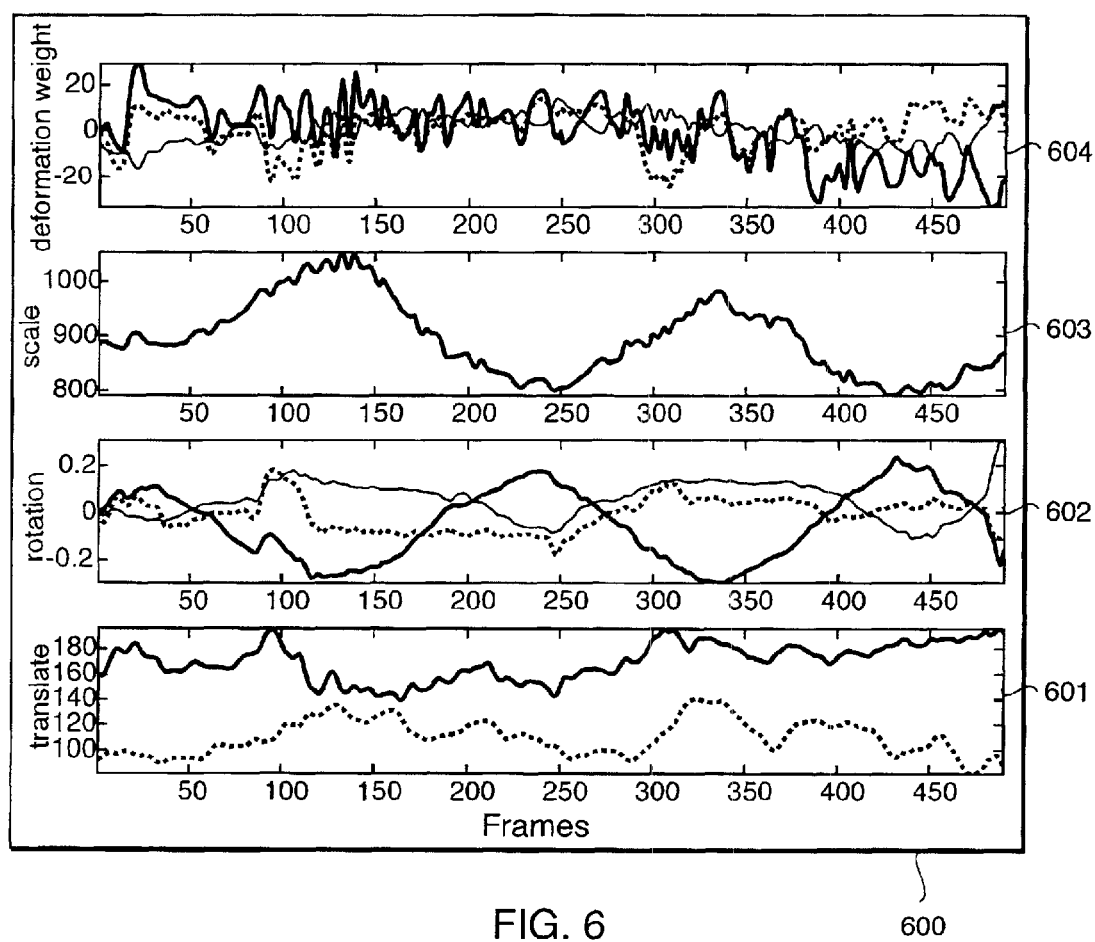
FIG. 6 is graph of recovered motion parameters according to the invention.

FIG. 6 show motion parameters recovered from an unconstrained video, i.e., there are no "markers" on the object from which the model is recovered. The object is a front-facing "talking head" with a relatively low texture, lighting changes during the sequence, the camera parameters are unknown, and there is motion in the background. The recovered parameters include translation 601, rotation 602, scale 603, and deformation coefficients 604. It is worth noting that the prior art Irani rank-reduced flow method fails to track this sequence, even when given the same rank constraints as here. The video was also presented to the prior art BHB process, which failed to separate jaw motions from head rotations.

Figure 7:
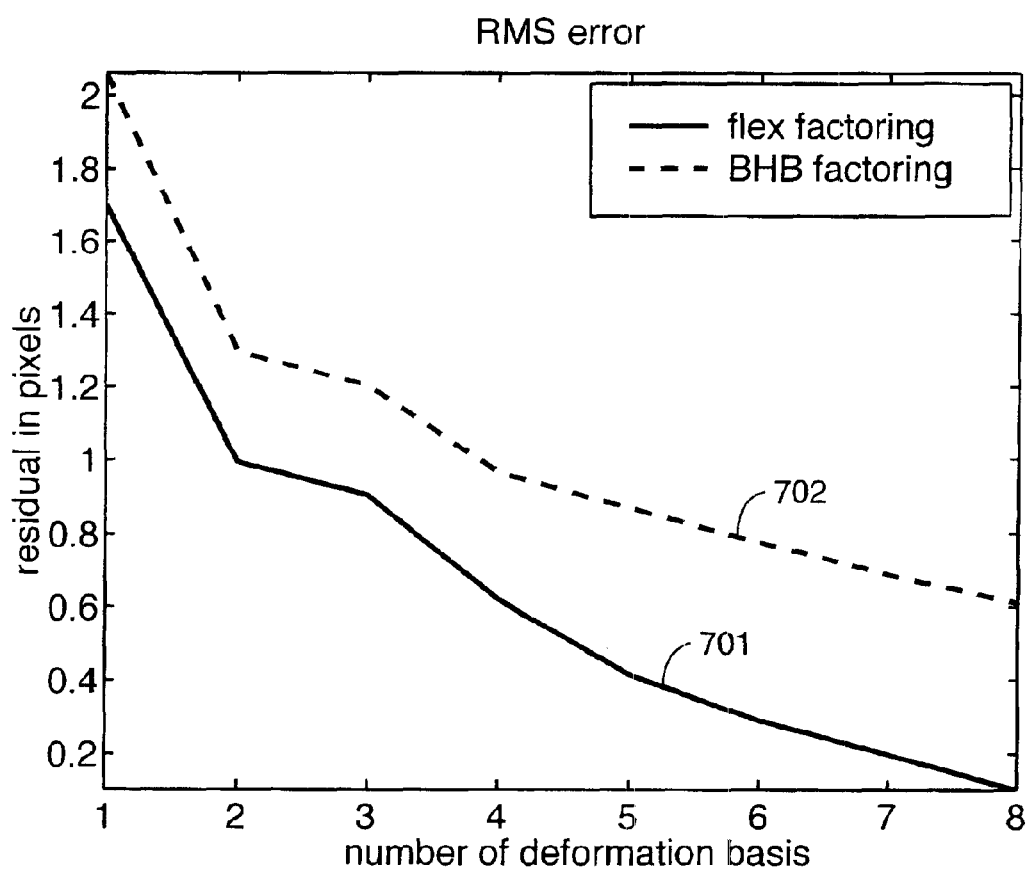
FIG. 7 is a graph comparing recovery methods.

FIG. 7 compares the RMS error of the present flex factoring 701 with the prior art (BHB factoring) 702. The improved reduction in the residual is obvious for the factoring according to the invention.

Effect of the Present Recovery Method

I have described a linear method for recovering 3D shape, motion, and articulations of non-rigid 3D objects from low-quality low-resolution video such as low-end consumer videos having partially degenerate textures. The output of my method is a 3D deformable model and 3D motion/morph parameters. I have identified a "parsimony" constraint, and use this constraint to correct singular valued decompositions of videos with undesirable properties. The recovered model and parameters can be used to synthesize novel videos. The invention is particularly useful for animating, altering, or morphing characters in movies and computer games. Current practice tediously extract models by using markers and manual extraction methods, on a frame-by-frame basis. This is frequently done in the movie industry when stand-ins or stunt-workers take place of the real actors, and it is later desired to overlay the stand-ins with images of the actors. My methods allow one to automate these processes at great savings in time, effort, and cost.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

I claim:

1. A method for recovering non-rigid 3D shape and motion of an object from a video of the object, comprising:
   determining correspondences of a set of features on the object in each image of the video;
   factoring the correspondences into a motion matrix and a shape matrix; and
   extracting a 3D model from the factored motion matrix and the shape matrix that conforms to the object in the video, the 3D model including a linear basis for deformable shape of the object in the video, and for each image a 3D rotations matrix, deformation coefficients, and translation vectors.

2. The method of claim 1 wherein the 3D model has a minimum residual error and minimal deformation coefficients.

3. The method of claim 1 further comprising:
   identifying the set of features in a reference frame of the video;
   determining a location for each feature in the reference frame;
   determining a corresponding location of each feature in each other frame of the video, the location of each feature in the reference frame and the locations of the corresponding features in each other frame forming the correspondences.

4. The method of claim 1 further comprising:
   selecting a first image of the video as the reference frame.

5. The method of claim 1 further comprising:
   selecting a middle image of the video as the reference frame.

6. The method of claim 1 further comprising:
   determining a location of each feature in each frame of the video, and gradients of image intensities in regions around each feature by comparing to the corresponding region in the reference frame.

7. The method of claim 1 wherein each region is approximately 5×5 pixels centered on each feature.

8. The method of claim 6 wherein the correspondences between successive images of the video are constrained to be consistent with a range of possible projections of a non-rigid 3D surface of the object having a finite number of deformations to enable the determining of the correspondences when regions within the images lack identifying marks and texture.

9. The method of claim 1 wherein the correspondence include quantification of spatial and temporal variations of image intensities around each feature, the quantification determined from gradients of the image intensities.

10. The method of claim 9 wherein the spatial variation at any location is X, the temporal variation between that location and a corresponding location in another image is Y, and X is an estimate of a covariance of an uncertainty in the temporal variations Y.

11. The method of claim 10 wherein the factoring uses a covariance of the spatial variations X to decompose the temporal variations Y into low-dimensional factors of the correspondences that preserve information about the temporal variations Y in a finite number of dimensions, and a distribution of the uncertainty in the low-dimensional factors is identically independently Gaussian, regardless of correlational structure of noise and error in the correspondences.

12. The method of claim 1 further comprising:
generating a novel video from the video by changing any combination of the shape matrix, the 3D rotations matrix, the deformation coefficients, and the translation vectors of the 3D model.

13. The method of claim 7 wherein the constraints of the factoring enforces the range of possible projections of the non-rigid 3D surface having the finite number of deformations to produce the motion matrix and the shape matrix.

14. The method of claim 13 further comprising:
transforming the motion matrix and the shape matrix to be consistent with image formation governing 2D projections of the non-rigid 3D object.

15. A method for recovering a 3D model of non-rigid 3D shape and motion of an object directly from an input video of the object, comprising:
identifying a set of features on the object in a reference image of the input video;
determining correspondences between the set of features in the reference image and corresponding features in each other image of the input video;
factoring the correspondences into a motion matrix and a shape matrix;
extracting the 3D model from the factored motion matrix and the shape matrix, the 3D model including a linear basis for deformable shape of the object in the input video, and for each image a 3D rotations matrix, deformation coefficients, and translation vectors; and
manipulating the 3D model and the input video to generate a novel video from the input video.

16. A system for recovering a non-rigid 3D model of a scene,
a camera configured to acquire an input video of the scene;
means for identifying a set of features in the scene in a reference image of the input video;
means for determining correspondences between the set of features in the reference image and corresponding features in each other image of the input video;
means for factoring the correspondences into a motion matrix and a shape matrix;
means for extracting the non-rigid 3D model from the factored motion matrix and the shape matrix, the 3D model including a linear basis for deformable shape in the scene, and for each image a 3D rotations matrix, deformation coefficients, and translation vectors.

17. The system of claim 16 further comprising:
a display device configured to display a novel video generated by manipulating the non-rigid 3D model and the input video.

18. The system of claim 16 wherein the scene includes a non-rigid deformable object.

19. The system of claim 16 further comprising:
a pointing device 106 to identify the set of features in the reference image.

20. The system of claim 16 further comprising:
a computerized vision system to automatically identify the set of features in the reference image.

* * * * *